Dec. 10, 1968  R. W. BUETOW  3,415,744
SOLVENT EXTRACTION METHOD FOR REMOVING SALT FROM WATER
Filed May 3, 1965  2 Sheets-Sheet 1

RALPH W. BUETOW
INVENTOR

BY
ATTORNEY

United States Patent Office 3,415,744
Patented Dec. 10, 1968

3,415,744
SOLVENT EXTRACTION METHOD FOR
REMOVING SALT FROM WATER
Ralph W. Buetow, Madison, Wis., assignor of one-half to Keith Schoff
Continuation-in-part of application Ser. No. 434,686, Feb. 23, 1965. This application May 3, 1965, Ser. No. 452,650
11 Claims. (Cl. 210—22)

ABSTRACT OF THE DISCLOSURE

A solvent extraction method for reducing saline content of aqueous solution using solvents of cyclic structure comprising oxygen ring members and a condensible gas in solution.

---

This invention relates to a solvent extraction method for reducing salt content in saline solution, and more particularly relates to a method for extracting potable water from sea water by liquid-liquid extraction.

This application is a continuation-in-part of patent application Serial No. 434,686 filed February 23, 1965.

In the method of this invention water containing dissolved mineral salt is contacted by a solvent in which water dissolves preferentially to salt causing two liquid phases to form, one as a brine and solvent raffinate layer and the other as a potable water (with respect to salt content) and solvent extract layer; the two phases are separated and each may again be contacted with a solvent to cause aqueous and organic phases to separate from each separated fraction, potable water being recovered from the extract fraction after expelling dissolved gases or removing residual solvent by other operable means.

It is an object of this invention to provide a liquid-liquid extraction method for extracting potable water from sea water.

It is another object of this invention to provide a solvent extraction method for extracting potable water from sea water utilizing relatively non-toxic, non-corrosive chemicals.

It is another object of this invention to provide an economical method for rendering saline water potable and suitable for large scale agricultural and industrial use.

Other objects will become apparent from the following detailed description and from the accompanying drawings in which.

Figure 1:
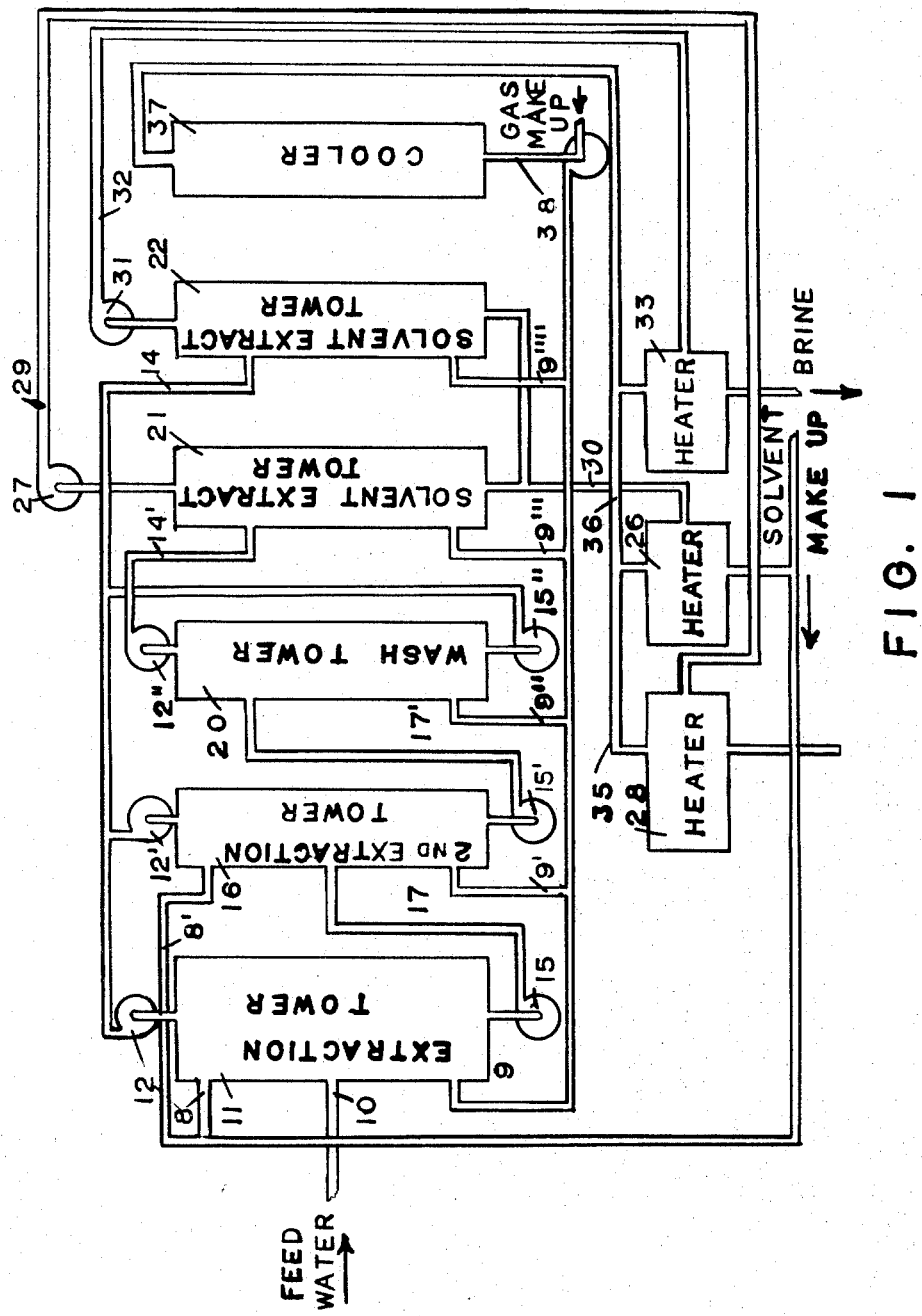
FIGURE 1 is a schematic flow diagram of the process of this invention.

This invention discloses a solvent extraction method for separating saline solution such as sea-water into two phases of differing salt concentration, which in a preferred method may be withdrawn as two component streams one of which comprises water having not more than about 0.03 percent by weight of residual salt, if multiple extraction procedure is used, and the second comprising brine. Separation of solvent from the two streams may be accomplished by introducing into each of the separated fractions a second solvent which may be a condensed gas or other non-polar agent which renders water and the first solvent immiscible or which renders azeotropic distillation possible.

Solvents suitable for use in this invention comprise those which form mutual solubility solution saline water with large differences in salinity occurring between phases; oxa-cyclic compounds such as dioxane, trioxane, trioxepane, Tetraoxopane, and homologs and lower alkyl substituents and oxy substituents thereof are suitable; preferred solvents have combined properties of low-toxicity, high stability under vaporizing temperature and pressure conditions, low hydrolysis constant, and non-corrosive activity so that end use for which product water is suitable is not restricted. S-trioxane is a preferred solvent for use herein alone and in synergistic combination with a minor proportion of trioxepane; it melts at 61° C. has a hydrolysis constant of $5.3 \times 10^{-7}$ min.$^{-1}$, is soluble from 21.1 gm./100 cc. of water solution at 25° C. to infinity in hot water, vaporizes under atmospheric pressure at 115° C. showing no decomposition at 200° C. for 2 hours, is not hydrolyzed in neutral or alkaline solution, undergoes only very slow hydrolysis in weak acid solution, and is of very low toxicity. Recovery from water solution may be effected by extracting it with non-polar water immiscible solvents, for example, ethylene dichloride, or methylene chloride, or with condensed gas such as nitrous oxide, carbon dioxide, or sulfur dioxide, or may be effected by azeotropic distillation as disclosed in U.S. Patents 2,432,771 and 2,439,777 where hexane is disclosed as a solvent which reduces distillation temperature.

At atmospheric pressure sym-trioxane crystallizes at higher concentrations from aqueous solution at about 48° C. and distills as a constant boiling mixture of about 70 percent sym-trioxane and 30 percent water at about 91° C.; addition of a solvent may lower crystallization temperature and distillation temperature, e.g. at atmospheric pressure with carbon dioxide added crystallization temperature may be lowered to 30° C. or below and with hexane added distillation temperature may be lowered to about 70° C. Sym-trioxane may be operably used over a wide range of pressure conditions from sub-atmospheric to 70 atmospheres or more.

Oxa-cyclic compounds, i.e. compounds of closed ring structure comprising multiple (—C—O—C—) bonding, are preferred for use herein to acyclic compounds because it is believed that hydrogen bonding of water is promoted by ether linkages, and in a cyclic molecule hydrogen bonding is essentially internally complete so that cross bonded aggregations of molecules or polymers is substantially avoided; the steric configuration of sym-trioxane wherein oxygen atoms and carbon atoms are grouped mutually independently in non-intersecting planes is believed to particularly enhance internal hydrogen bonding.

Mineral salts as occur in sea water are soluble in sym-trioxane-water solutions at 48° C. to about 1.6 percent by weight in the water portion calculated as sodium chloride; at lower temperature sym-trioxane crystallization occurs. Addition of a small amount of a condensed gas such as carbon dioxide will reduce sodium chloride solubility in water to a 0.1 percent by weight for water in the water-solvent rich phase in comparison to 1.6 percent solubility in water without such addition; sym-trioxane precipitation temperature in the phase is reduced to about 30° C. Carbon dioxide to the order of 50 weight percent may further be added to the solvent rich water phase after it is separated to cause solvent and water to become immiscible and separate into two phases with residual contamination of the water by the solvent being under 0.03 percent by weight and within tolerable limits for human consumption and for agricultural and industrial use, carbon dioxide being recoverable after separation of solvent and water upon slight heating and/or release of pressure. The process of this invention may be performed throughout at near ambient temperature, i.e. between about 15° C. and 40° C. with super-atmospheric pressure only being necessary to contain carbon dioxide during extraction and to condense and recover it after it is freed from the product water. The process may be conducted at pressures, either sub-atmospheric or super-atmospheric as may be most advantageous in view of the particular conditions existing at a process installation.

Referring now to FIGURE 1, a schematic flow diagram of a process of this invention is shown wherein salt feed water stream 10 is introduced into extraction tower 11. The tower may be heated or cooled by conventional means which are not shown, but which may comprise internal heating or cooling coils. A temperature greater than the temperature at which crystallization of components would occur must be attained. Solvent is introduced into tower 11 through pipe 8, and an activating agent may be introduced into either the solvent or feed water before entry into tower 11, or may be introduced directly through pipe 9 into tower 11 as shown. For use of sym-trioxane as solvent and carbon dioxide as activating agent (in concentration in the order about 10 weight percent of total solution) a temperature in tower 11 of 40° C. is sufficient to avoid precipitation of crystals of trioxane. Total vapor pressure of about 250±40 p.s.i. will obtain under such conditions. The contents of tower 11 are brought into intimate mutual contact by means not shown, but which may comprise countercurrent flow of components through sieve plates, tower packing or the like. Two phases form in tower 11 as well separated raffinate and extract layers. The upper phase (raffinate if the stated components are used) is pumped by pump 12 to solvent recovery tower 22 through pipe 14. The lower phase (extract) is pumped from the bottom of tower 11 by pump 15 to second stage extraction tower 16 through pipe 17. Solvent is introduced into tower 16 through pipe 8', and activating agent is added to the bottom of tower 16, through pipe 9'. Raffinate and extract are pumped from tower 16, which may be similar in structure and operation to tower 11, through pumps 12' and 15' respectively. The raffinate is emptied to pipe 14 and the extract is conducted through pipe 17' to wash tower 20. Activating agent which is used to wash the water fraction is introduced to tower 20 through pipe 9". From tower 20, which may be similar in structure to towers 11 and 16, raffinate is pumped from the top of wash tower 20 by pump 12" to recovery tower 21 through pipe 14' and extract is pumped by pump 15" through pipe 14 to solvent recovery tower 22. In solvent recovery tower 21, which may be structurally similar to extraction towers 11, 16, and 20, a second solvent is introduced which in FIGURE 1 is the same material as the activating agent introduced into the extraction towers 11, 16, and 20; using the above stated components the second solvent is liquid carbon dioxide and is introduced to tower 21 through pipe 19'''. The more dense solvent phase is withdrawn from tower 21 through pipe 25 to heater 26. The less dense water phase is pumped from the top of tower 21 by pump 27 to heater 28 through pipe 29.

A second solvent is introduced into solvent recovery tower 22 in a manner similar to that shown for tower 21. In FIGURE 1, a condensed gas is used in different concentrations both as activating agent and separating agent to effect respectively, mixing and de-mixing action on the mixture of solvent and water in the towers. The more denes solvent phase is withdrawn from tower 22, in all material respects similar to tower 21, through pipe 30 into pipe 25 and heater 26. The less dense brine phase is pumped from the top of tower 22 by pump 31 through pipe 32 to heater 33. Each of heaters 26, 28, and 33 is heated, means not shown, to a temperature sufficiently great to vaporize the second solvent. The critical temperature of carbon dioxide is 31° C., and heating may not be necessary under all operating conditions.

The vapors released in heaters 26, 28, and 33 are piped (by pipe 35 for heater 26) into manifold 36 which exhausts in cooler 37 where the vapors are condensed and withdrawn by pipe 38 into liquid activating solvent make-up pipe 9. Cooler 37 may incorporate compressor stages or other means as may be necessary to condense, dry, and otherwise render the recovered solvent reusable. If the process is operated at super-atmospheric pressure, means not shown, such as brine and product water, driven turbines may be used to pump feed water into the process.

The brine discharge from the bottom of heater 33 may be collected for by-product recovery. Solvent discharge from heater 26 is returned through pipe 39 to solvent make-up pipe 8 for re-use. Fresh potable water is obtained from the bottom of heater 28 containing less than 0.05 weight percent salt and not more than about 0.03 weight percent solvent if trioxane is used.

In the process illustrated in FIGURE 1, it may be desirable to pre-mix and filter feed components before introducing them to extraction tower 11 to remove solid impurities and any complex-ion hydrate precipitate that may form upon addition of extraction solvents to saline water although such precipitation is not substantial.

Figure 2:
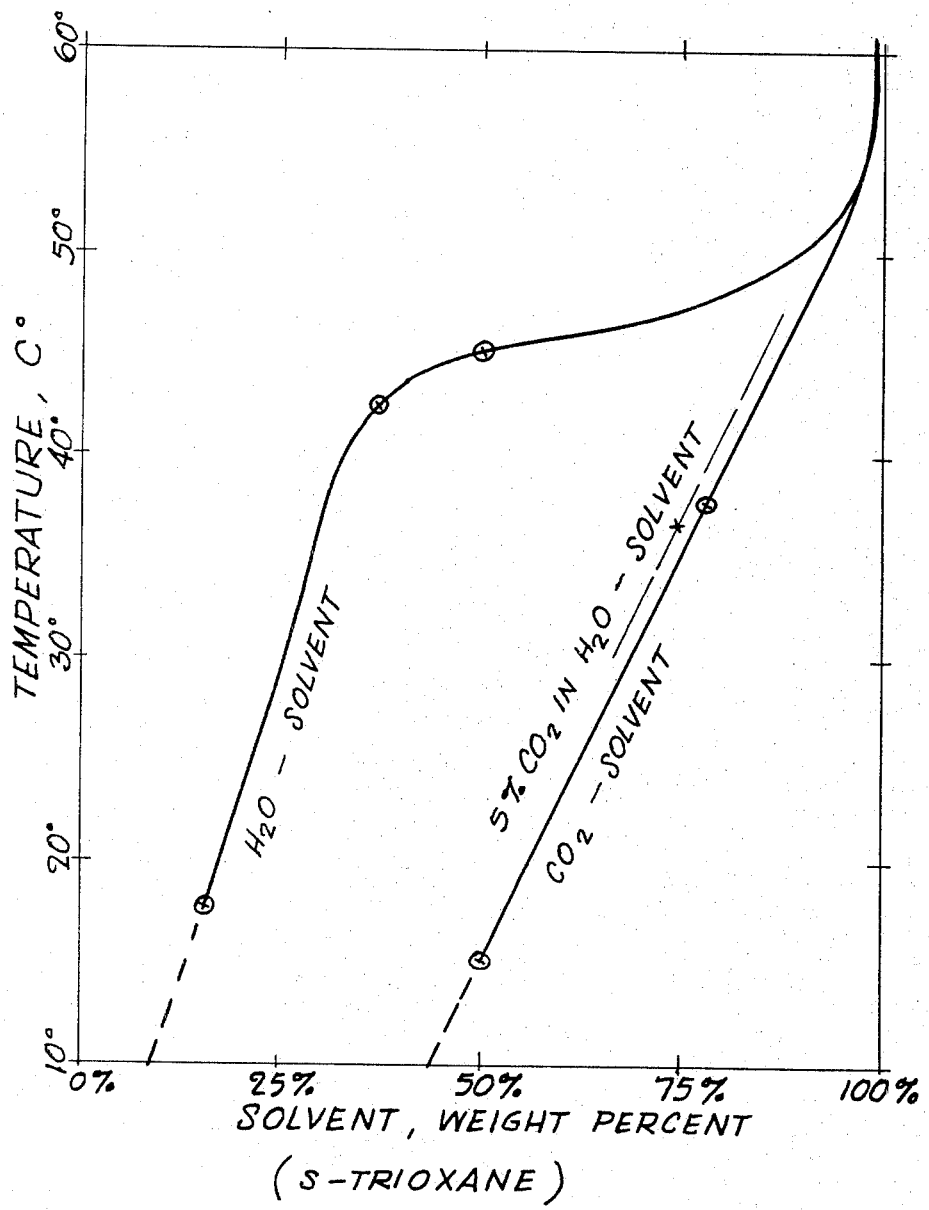
FIGURE 2 is a solvent crystallization curve for trioxane in carbon dioxide solution, carbon dioxide-water solution, and in water solution.

FIGURE 2 is a semi-qualitative composition diagram for a system of water-sym-trioxane-carbon dioxide in which the effect of small quantities of carbon dioxide in depressing the freezing point of sym-trioxane in aqueous solution will be noted, i.e. the freezing point at atmospheric pressure is depressed from 48° C. to about 15° C. with addition of an amount to 50 weight percent liquid carbon dioxide. The critical temperature of carbon dioxide is 31° C., however the solubility of carbon dioxide in sym-trioxane is sufficiently great to enable it to be dissolved in water-trioxane solutions or mixtures in all feasible solvent proportions to about 20 weight percent of the maximum usable in tower 11 of FIGURE 1, or to about 50 weight percent as usable in the recovery towers.

As used herein potable water means water having less than 0.2 percent by weight mineral salt content; brackish water from about 0.2 percent to 0.5 percent by weight mineral salt content; sea water about 3.5 percent by weight mineral salt content; brine greater than about 3.5 percent by weight mineral salt content.

S-trioxane is used herein to mean trioxane as obtained from known methods of synthesis, asymmetric trioxane being present in insufficient quantities to require separation for use in the processes herein described.

The following examples illustrate the process of this invention:

EXAMPLE I 25 ml. Pacific Ocean water obtained near Los Angeles, Calif., having 3.4 wt. percent total halogen content calculated as NaCl; 60 gms. trioxane.

The above components were placed in a separatory funnel, heated in a water bath to 61° C. and stirred until complete dissolution occurred. The funnel and contents were cooled to 51° C. in the water bath with frequent stirring with the appearance of two phases, the lower phase being 58 ml. in volume and the supernatant phase 19 ml. in volume. The phases were separated at 51° C. after which the lower phase was cooled to below 48° C. with the precipitation of trioxane crystals. An equal volume of ethylene dichloride was added to the lower phase dissolving all trioxane crystals and freeing occluded water which floated on a trioxane-diethylene dichloride rich lower layer. Samples of the floating water layer were removed by pipette and washed with ethylene dichloride to remove residual traces of trioxane after which they were titrated for chloride with 0.1 N AgNO$_3$. The samples obtained analyzed 1.8 wt. percent total halogen calculated as NaCl.

EXAMPLE II 50 ml. of 3.5 wt. percent solution of NaCl in water; 121 gms. of trioxane.

The above components were placed in a 300 ml. separatory funnel at 61° C. and completely dissolved with stirring into one phase. The total solution volume was 155 ml. The contents of the funnel were cooled in a water bath slowly with frequent stirring and were observed to separate into two liquid phases upon standing. The volumes of the phases were observed; at 57° C. the lower phase was 110 ml.; at 52° C., 100 ml.; and at 48° C. trioxane crystallization occurred. The temperature of the funnel and contents was raised to 57° C. by heating in a water bath with stirring. At 57° C. the lower phase of 110 ml. was removed to a second separatory funnel. A volume of 40 ml. of the remaining upper layer was washed with an equal volume of ethylene dichloride with the appearance of a brine layer floating on a trioxane-ethylene dichloride rich lower layer. The lower layer was removed from the first funnel and the remaining brine layer in the funnel was again washed with ethylene dichloride to remove traces of trioxane. After removing the second ethylene dichloride wash layer the brine layer remaining 21 ml. in volume was titrated with 0.1 N AgNO$_3$. It was found to contain 4.5 wt. percent NaCl. The temperature of the second funnel was adjusted to 55° C. Two layers appeared. The lower layer was removed and treated as in Example I. The supernatant layer was washed and analyzed in the manner of the supernatant layer of the first funnel. The brine layer 11 ml. in volume formed in the supernatant phase 15 ml. in volume from the second funnel contained 4.0 wt. percent NaCl, and the brine layer 19 ml. in volume formed in the lower phase 95 ml. in volume from the second funnel contained 1.7 wt. percent NaCl as titrated with 0.1 N AgNO$_3$.

Additional extractions of 3.5 wt. percent NaCl solutions in water were separately conducted in the manner and with the proportions of Example II with each of the following solvents replacing sym-trioxane $(CH_2—O—CH_2—O—CH_2—O)$ para-dioxane $(CH_2—O—CH_2—CH_2—O—CH_2)$ and 1,3,5-trimethyl trioxane (paraldehyde). Product water of equivalent saline concentration in either case was substantially less than yield obtained in Example II, and in each extraction solvent hydrolysis and apparent toxicity of the decomposition product was greater than that for trioxane in Example II. Solvents which may be preferred to both latter named solvents include 1,3,5-trioxepane; 1,3,5-trioxane-2-oxy; 1,3,5-trioxane-2,4,6-trioxy, and monomethyl and mono-ethyl substituents of each of said hydrocarbon solvents. Solvents may be used in combination and with tetraoxocane $(CH_2—O—CH_2—O—CH_2—O—CH_2—O)$ or lower alkyl substituents. The stability of each said solvent was less at elevated temperatures and under hydrolyzing conditions than for trioxane, and none is preferred for use in the method disclosed herein.

Precipitation and separation of phases with trioxane conducted as in Example II, but at increasing pressures to 1500 p.s.i. did not materially affect phase volumes, and phase compositions were found to be similar to those of Example II in NaCl content.

The processes of this invention can be performed by continuous multiple extraction methods.

EXAMPLE III 50 ml. of 3.5 wt. percent solution of NaCl in water; 120 gms. trioxane.

The precipitative extraction procedure of Example II was followed with additional extractions being made in the described manner of each phase of the second funnel and of the supernatant phase of thte first funnel.

| Supernatant phase | Lower phase |
|---|---|
| 1st separation at 61° C.: <br> 16 ml. total. <br> 8.3 ml. water layer. <br> 4.8 wt. percent NaCl in water. <br> 2nd separation using supernatant phase; 1st separation at 49° C.: <br> 12 ml. total. <br> 7.5 ml. water layer. <br> 5.3 wt. percent NaCl in water. <br> 2nd separation using lower phase 1st separation 56° C.: <br> 22 ml. total. <br> 15 ml. water layer. <br> 4.6 wt. percent NaCl in water. <br> 3rd separation using lower phase; 1st separation, supernatant phase; 2nd separation at 49° C.: <br> 20 ml. total. <br> 14 ml. water layer. <br> 4.8 wt. percent NaCl in water. <br> 3rd separation using lower phase; 1st separation, lower phase; 2nd separation at 49° C.: <br> 10 ml. total. <br> 5 ml. water layer. <br> 3.8 wt. percent NaCl in water. | 1st separation at 61° C.: <br> 137 ml. total. <br> 40 ml. water layer. <br> 3.0 wt. percent NaCl in water. <br> 2nd separation using supernatant phase; 1st separation at 49° C.: <br> 4 ml. total. <br> .7 ml. water layer. <br> 2.0 wt. percent NaCl in water. <br> 2nd separation using lower phase 1st separation at 56° C.: <br> 115 ml. total. <br> 26 ml. water layer. <br> 2.0 wt. percent NaCl in water. <br> 3rd seapration using lower phase; 1st separation, supernatant phase; 2nd separation at 49° C.: <br> 2 ml. total. <br> .5 ml. water layer. <br> 1.8 wt. percent Nacl in water. <br> 3rd separation using lower phase; 1st separation, lower phase; 2nd separation at 49° C.: <br> 105 ml. total. <br> 21 ml. water layer. <br> 1.6 wt. percent NaCl in water. |

EXAMPLE IV 25 ml. of 3.5 wt. percent solution of NaCl in water; 60 gms. trioxane.

The above components were placed in a separatory funnel at 54° C. and after stirring and dissolution were observed to separate into a supernatant phase 30 ml. in volume and a lower phase 50 ml. in volume. The procedure of Example II was followed by cooling the funnel and at 51° C. separating a lower phase 49 ml. in volume. Trioxane was extracted from the separate phases by double washing with ethylene dichloride in the manner of Example II to yield water layers 7 ml. in volume with 1.8 wt. percent NaCl in the lower phase and 16 ml. in volume with 4.6 wt. percent NaCl in the supernatant phase.

EXAMPLE V 56 gms. sym-trioxane; 30 gms. sea water having 3.4 percent by weight salt content calculated as NaCl.

The above components were placed in a stainless steel separatory funnel and dissolved by being heated to 60° C. with stirring, after which the funnel was tightly sealed by securing the top; 6 ml. carbon dioxide as liquid was introduced into the contents of the funnel through a valve and the funnel and contents were then immersed in a water bath and cooled to 41° C. The pressure within the funnel at this temperature was about 300 p.s.i.g. Two liquid layers formed in the funnel without precipitating a solid phase (precipitation would occur at about 39° C.) and after shaking of the funnel and contents equilibrium between phases was obtained by letting the funnel sit for five minutes. A 17 ml. sample was drawn from the lower layer through a valve in the bottom of the funnel. The sample was ejected from the funnel into a smaller sealed chamber in which pressure was released after the funnel was again sealed. An equal volume of ethylene dichloride was added to the sample causing dissolved water to appear as a supernatant layer. After separating the water layer it was again washed with an equal volume of ethylene dichloride and was analyzed for halogen content by titrating with 0.1 N AgNO$_3$ solution. The titration showed 0.08 percent by weight halogen calculated as NaCl in the water which was about 2 ml. in volume.

EXAMPLE VI

The procedure of Example V was repeated at a water bath temperature of 55° C. The water obtained from the sample withdrawn from the funnel was found to contain 0.35 percent by weight halogen calculated as NaCl. The proportion of water in the sample was measurably higher than that of Example V.

EXAMPLE VII

The procedure of Example V was followed for obtaining a sample; washing of the sample with ethylene dichloride was omitted. After withdrawing the sample superatmospheric pressure was not released, but the sample was cooled to about 23° C. and additional carbon dioxide was introduced as liquid until it comprised slightly in excess of 20 percent of the weight of the sample with super atmospheric pressure being about 650 p.s.i.g. After shaking the sample two liquid layers formed and the more dense solvent layer was withdrawn from the sample. The remaining supernatant water layer was multiply washed with equal volumes of liquid carbon dioxide. After three washings the water was found to contain 0.03 weight percent syn-trioxane and 0.05 weight percent halogen calculated as NaCl. The proportion of water in the sample was similar to that of Example V.

EXAMPLE VIII

The procedure of Example V is followed except that the temperature of the funnel is adjusted to 32° C. and a total of 17 ml. of liquid carbon dioxide is introduced to the funnel to provide total vapor pressure of 1060 p.s.i.g. A sample is withdrawn from the funnel and cooled to 30° C. condensing the carbon dioxide while 15 ml. additional liquid carbon dioxide is introduced to maintain the vapor pressure. After separating two phases which form in the sample and washing the water phase three successive times with liquid carbon dioxide, the halogen content of the water is determined by titration with 0.1 N $AgNO_3$ and is found to be less than in Example VII.

EXAMPLE IX 70 gms. monomethyl trioxane; 32 gms. sea water.

The above components are intimately mixed at 25° C. After letting the mixture sit for five minutes two phases which appear in the mixture are separated and are introduced into separate stainless steel separatory funnels. Nitrous oxide is introduced into the contents of each of the funnels until pressures of 400 p.s.i.g. are obtained. After thorough mixing of the contents the contents of each funnel separates into two phases. A sample drawn from the bottom of the funnel containing the lower phase of the initial mixture is washed twice with nitrous oxide and is analyzed for halogen by titration with 0.1 N $AgNO_3$. The halogen content calculated as NaCl is found to be less than 0.1 weight percent of the water solution.

The procedure of Example XI may be repeated using 1,3,5-trioxepane or using 1,3,5-trioxane, 2,4,6-trioxy to yield results similar to that of Example XI. The monomethyl and mono-ethyl substituents of dioxane, trioxane, and trioxepane may also be used with similar results, and at lower temperature than are possible with the unsubstituted solvents, but with somewhat greater hydrolysis of the solvent.

EXAMPLE X 20 gms. salt water (1.6 percent NaCl); 40 gms. symtrioxane; 20 gms. trioxepane.

The above components at 18° C. are placed in a separatory funnel and intimately mixed. After letting the funnel sit for five minutes the two phases which appear are separated and the lower phase fraction is mixed with an equal volume of ethylene dichloride. The water and solvent phases which appear are separated and the water is washed twice with equal volumes of ethylene dichloride at 18° C. The halogen content calculated as NaCl is determined by titration with 0.1 N $AgNO_3$. Halogen content is less than 0.3 weight percent of water solution. The lower phase fraction in the separatory funnel constitutes about two-thirds the original total volume, and from about 10 percent to 15 percent of the lower phase was absorbed water.

Trioxepane is described in U.S. Patents 2,475,610 and 2,625,569; it is a liquid at room temperature and boils at 131° C. at atmospheric pressure.

EXAMPLE XI

A process of Example X is repeated and 6 ml. of liquid carbon dioxide is introduced into the separatory funnel before mixing of the components. The extracted water is of similar volume to that of Example X, and has a halogen content calculated as NaCl of less than 0.1 weight percent of water solution.

EXAMPLE XII 30 gms. sea water, 30 gms. tetraoxocane, 30 gms. trioxepane.

The above components at 18° C. are placed in a separatory funnel and intimately mixed. After letting the funnel sit for five minutes the two phases which appear are separated and the lower phase fraction is thoroughly mixed with an equal volume of condensed difluorodichloromethane in a sealed stainless steel separatory funnel at 25° C. and 90 p.s.i.g. After funnel and contents sit for five minutes a sample is withdrawn from the upper phase which forms in the funnel and is washed twice with condensed difluorodichloromethane and analysed for halogen content by titration with 0.1 N $AgNO_3$. Calculated as NaCl the halogen content is less than 0.4 weight percent of water solution.

Condensible gases generally and in particular other members of those sold commercially as "freon" such as, for example, trifluoromonochloromethane may be used as a separatory agent in the process of this invention. Halogenated solvents are also generally suitable as separatory agents herein.

The procedure of Example XII is repeated at 25° C. using meta-dioxane and trioxane in place of tetraoxecane and trioxepane. The halogen content calculated as NaCl is less than 0.5 weight percent of water solution.

It is possible in the processes of this invention wherein trioxane is used as solvent to concentrate the salinity of the rejected phase to about 8.0 percent by weight NaCl in water, and similar concentrations may be expected with other solvents herein disclosed. Synergistic solvent action may be provided by using multiple solvents in combination e.g. trioxane and trioxepane as shown in Example X, to yield potable water in greater quantity than can be obtained by use of either solvent alone with the given solvents, and the range of processing temperatures may be greatly increased so that sea water at ambient temperature may be processed without heating, the freezing range of the solvent mixture being depressed by trioxepane which freezes at 4° C.

EXAMPLE XIII 35 ml. of 26 wt. percent solution of NaCl in water; 7.5 gms. trioxane.

The above components were placed in a separatory funnel at 55° C. and stirred. A 2 ml. trioxane rich supernatant phase appeared and crystalline salt was observed in the lower phase. Upon cooling to 48° C. crystals of trioxane precipitated. Upon heating the components in a water bath to 64° C. the supernatant trioxane rich phase was reduced to ½ ml. or less while an estimated 1½ ml. of NaCl crystals appeared on the bottom of the funnel. 7½ gms. of trioxane were added and the temperature raised to 68° C. and the contents stirred. After allowing to stand about 2 ml. of NaCl crystals were removed from the bottom of the funnel and were washed with acetone, dried, and found to weigh 1.5 gms.

EXAMPLE XIV 168 gms. of trioxane were placed in a separatory funnel and melted at 62° C. in a water bath. 7 cc. of 3.5 wt. percent solution of NaCl in water were added to the funnel dropwise while the temperature was maintained at about 55° C. Upon the addition of each drop of saline solution salt crystals were observed to precipitate in the funnel. The water appeared to be completely absorbed. 2 cc. of additional 3.5 wt. percent solution of NaCl in water were added with dissolution of all salt crystals in the vessel being observed and with a second liquid phase dispersed as droplets throughout the funnel content appearing. Separation of the disperse phase as a supernatant layer was not effected by standing and the density differential between phases was not sufficient to cause separation of layers until the salt rich phase was more dilute. This extraction method was considered less satisfactory than the addition of solvent to saline solution as in the preceding examples.

Precipitation and separation of phases conducted in the manner of Example II, but at increasing pressures to 1500 p.s.i. did not materially affect phase volumes, and phase compositions were found to be similar to those of Example II in NaCl content.

As used herein "oxa-cyclic" means cyclic organic compounds consisting of carbon and oxygen as cyclic members, and all other nomenclature is as prescribed in Nomenclature of Organic Chemistry 1957, Butterworth's Scientific Publications, London, 1958, which embodies approved nomenclature of the International Union of Pure and Applied Chemistry.

While certain examples have been described for the purpose of illustrating the invention, it is to be understood that variations will be suggested to persons familiar in the art and that the invention is not limited except by limitations clearly imposed in the appended claims.

I claim:
1. In a process for purifying water non-potable because of salinity by extracting with oxa-cyclic organic solvent, an improvement comprising the steps of dissolving in liquid solution phase of said water and said solvent at least one condensible gas substance in an amount to provide a solution phase comprising water potable with respect to salinity.
2. In a process for purifying water non-potable because of salinity by extracting with oxa-cyclic organic solvent comprising at least three carbon atoms and at least two oxygen atoms as cyclic members in a ring consisting of from six to eight said atoms, an improvement comprising the steps of dissolving in solution phase comprising said water and said solvent at least one member selected from the group consisting of carbon dioxide and nitrous oxide in an amount to provide a solution phase comprising water potable with respect to salinity.
3. In a process for purifying water non-potable because of salinity by extracting with oxa-cyclic organic solvent, an improvement comprising the steps of dissolving in liquid solution phase of said water and said solvent at least one condensible gas substance in an amount to provide a solution phase comprising water potable with respect to salinity, separating at least said phase comprising water potable with respect to salinity and contacting therewith at least one member of a group consisting of condensible gases and substantially water immisible liquid substance having solubility with said solvent in an amount to provide a liquid phase comprising water potable with respect to salinity and substantially free of said solvent.
4. The process of claim 3 wherein said water potable with respect to salinity and substantially free of solvent is subjected to temperature and pressure whereby condensible gases therein are removed in gaseous state therefrom.
5. In a process for purifying water non-potable because of salinity by extracting with oxa-cyclic organic solvent comprising at least three carbon atoms and at least two oxygen atoms as cyclic members in a ring consisting of from six to eight said atoms, an improvement comprising the steps of dissolving in solution phase comprising said water and said solvent at least one member selected from a group consisting of carbon dioxide and nitrous oxide in an amount to provide a solution phase comprising water potable with respect to salinity separating at least said phase comprising water potable with respect to salinity and contacting therewith at least one member of a group consisting of condensible gases and substantially water immisible liquid having solubility with said solvent in an amount to provide a liquid phase comprising water potable with respect to salinity, and substantially free of said solvent.
6. The process of claim 5, wherein said water potable with respect to salinity and substantially free of solvent is subjected to temperature and pressure whereby condensible gases therein are removed in gaseous state therefrom.
7. A process for providing potable water with respect to saline content from non-potable aqueous solution of mineral salt comprising the steps of:
 (a) introducing into said solution with intimate contact and at least partial dissolution a quantity of at least two oxa-cyclic organic compounds comprising at least three carbon atoms and at least two oxygen atoms in a ring consisting of from six to eight said atoms wherein one of said compounds is selected from a group consisting of trioxepane and lower alkyl substituents thereof and oxygen substituents thereof,
 (b) controlling temperature thereof below the temperature of total dissolution to cause formation of plural phases,
 (c) separating said phases,
 (d) introducing into at least said separated phase comprising lesser salinity at least one member of a group consisting of condensible gases and substantially water immisible liquid having solubility with said solvent in an amount to provide a liquid phase comprising water potable with respect to salinity and substantially free of said solvent and azeotropic solvents,
 (e) providing water potable with respect to saline content by subjecting mixture of said separated phase comprising lesser salinity and said member to temperature and pressure to remove from water as gaseous phase at least one of said member, said solvent, and said gases.
8. In the process of claim 7, wherein said non-potable aqueous solution of mineral salt comprises not more than 1.6 percent by weight mineral salt.
9. The process of claim 7, wherein said solution is contacted by said oxa-cyclic organic compound at ambient conditions of temperature and pressure.
10. The process of claim 7, wherein said oxa-cyclic organic compounds consist of paradioxane; meta-dioxane; trioxane; 1,3,5-trioxane-2-oxy; trioxepane; tetraoxocane, and lower alkyl substituents thereof, and oxygen substituents thereof.
11. The process of claim 7, wherein said plural phases comprise a solid salt phase.

References Cited
UNITED STATES PATENTS 3,088,909  5/1963  Davison et al. _____ 210—22
3,231,491  1/1966  Knap _____ 210—21
3,239,459  3/1966  Patterson _____ 210—21

(Other references on following page)

OTHER REFERENCES

Harwell et al., "Desalination By Liquid-Liquid Extraction," First Annual Report, October 1954, pp. 1, 2, 6 and Dept. of Interior, Office of Saline Water Conversion Contract No. 14-01-001-60, research conducted through the Texas A. & M. Research Foundation, College Station, Tex.

REUBEN FRIEDMAN, *Primary Examiner.*

F. SPEAR, *Assistant Examiner.*

U.S. Cl. X.R.

210—511, 54; 23—312